UNITED STATES PATENT OFFICE.

MONE R. ISAACS, OF PHILADELPHIA, PENNSYLVANIA.

GLUE OR SIZING.

No. 838,785.     Specification of Letters Patent.     Patented Dec. 18, 1906.

Application filed February 24, 1906. Serial No. 302,753.

*To all whom it may concern:*

Be it known that I, MONE R. ISAACS, a citizen of the United States, and a resident of the city and county of Philadelphia, in the State of Pennsylvania, have invented certain new and useful Improvements in Glue or Sizing, of which the following is a full, clear, and exact description.

The object of my invention is the preservation and enriching of substances liable to decay—such, for instance, as animal proteids and glue, sizing, or paste prepared therefrom. In the preservation of such substances, particularly of sizing or paste, it has been very difficult to utilize well-known preservatives, because many of the latter have an injurious effect upon the sizing or paste.

My invention consists in the discovery that by combining with an animal or vegetable proteid a small proportion of sodium fluorid, not only will the proteid be prevented from decaying, but its qualities will be unimpaired. Thus when used with casein-sizing (which, as is well known, may consist of casein and an alkali) it not only preserves the same without deleterious effect, but also assists in making such sizing hard and waterproof when dried after using, does not precipitate the casein in the sizing when in solution, and also serves as a mordant.

In carrying out my invention I would mix, either in a dry powdered state or as a solution, if preferred, about two per cent. of the sodium fluorid with the sizing or substance to be preserved. Sodium fluorid being readily soluble in water when mixed in a dry state with the sizing, such as the well-known casein-sizing, will dissolve with the sizing when the latter is prepared for use without causing any precipitation of the latter.

Having thus described my invention, I claim as new and desire to secure by Letters Patent—

1. A new composition of matter comprising sodium fluorid and a proteid.

2. A new composition of matter comprising sodium fluorid and an animal proteid.

3. A composition of matter comprising casein, an alkali, and sodium fluorid.

4. A composition of matter comprising, in a dry powdered state, casein, an alkali, and sodium fluorid.

5. A composition of matter comprising casein-sizing, and two per cent. of sodium fluorid.

In testimony whereof I have hereunto affixed my signature.

MONE R. ISAACS.

Witnesses:
    WALTER C. PUSEY,
    WM. H. SMITH.